United States Patent [19]
Kokura et al.

[11] Patent Number: 6,069,988
[45] Date of Patent: May 30, 2000

[54] OPTICAL FIBER AND ITS MANUFACTURING METHOD

[75] Inventors: Kunio Kokura, Chiba; Koichi Furukawa, Kanagawa; Ikuo Ota, Chiba; Kazunori Watanabe, Chiba; Shigehito Yodo, Chiba, all of Japan; Luksun Li, Berkshire, United Kingdom

[73] Assignee: The Furukawa Electric Co., Ltd., Tokyo, Japan

[21] Appl. No.: 08/884,068

[22] Filed: Jun. 27, 1997

[30] Foreign Application Priority Data

Jul. 2, 1996 [JP] Japan ..................... 8-171958

[51] Int. Cl.[7] ..................... G02B 6/34
[52] U.S. Cl. ............... 385/37; 385/123; 385/144
[58] Field of Search ............... 385/37, 142, 144, 385/145, 123; 359/576, 566

[56] References Cited

U.S. PATENT DOCUMENTS 5,367,589  11/1994  MacDonald et al. ............ 385/37
5,629,804  5/1997  Tomono ..................... 359/576

FOREIGN PATENT DOCUMENTS 5-188222  7/1993  Japan ..................... 385/37

OTHER PUBLICATIONS

Webster's II, New Riverside University Dictionary, p. 275, 1984.

*Primary Examiner*—Rodney Bovernick
*Assistant Examiner*—Ellen E. Kang
*Attorney, Agent, or Firm*—Frishauf, Holtz, Goodman, Langer & Chick, P.C.

[57] ABSTRACT

An optical fiber which comprises a coating layer disposed outside a bare optical fiber having a core and a cladding and a grating formed in the core of the exposed bare optical fiber by removing the coating layer and its manufacturing method. The optical fiber is provided with a re-coating layer disposed in the exposed bare optical fiber.

11 Claims, 7 Drawing Sheets

F I G. 5
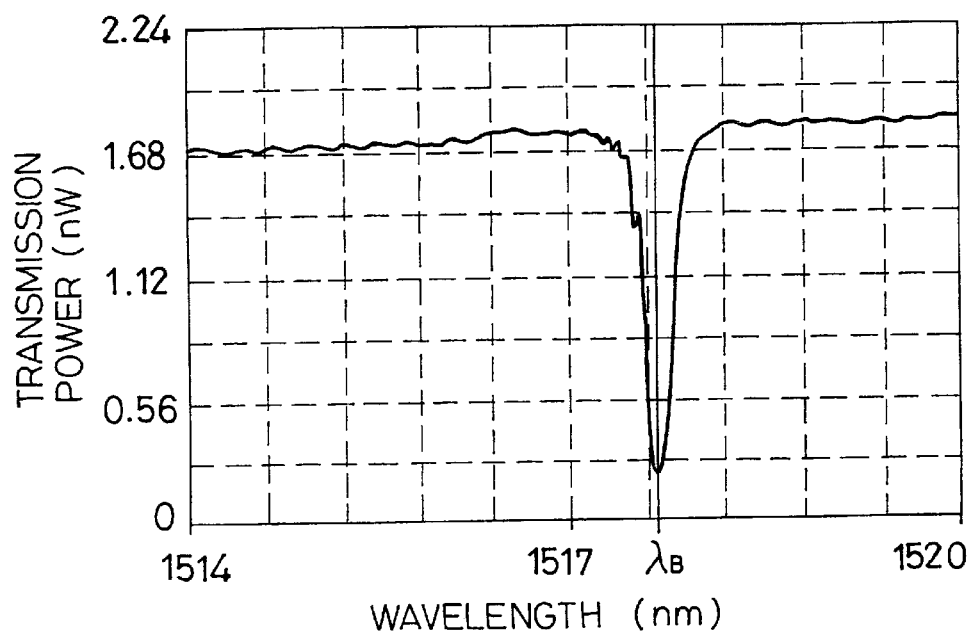
F I G. 6
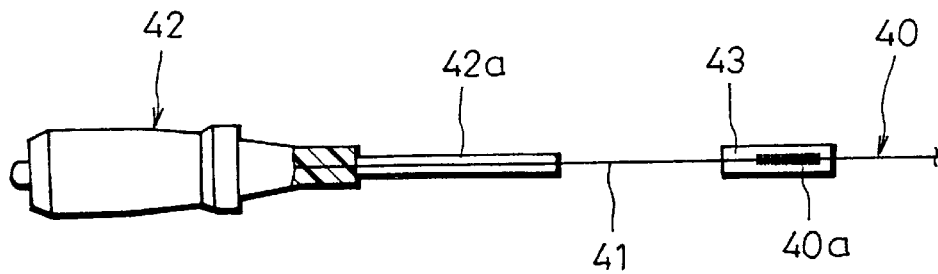

OPTICAL FIBER AND ITS MANUFACTURING METHOD

BACKGROUND OF THE INVENTION

1. Field of the Invention

The present invention relates to an optical fiber having a grating and its manufacturing method.

2. Description of the Related Art

For an optical fiber having a grating, a single mode fiber, a high Ge dope dispersion shift fiber and the like are used. In such an optical fiber, for example, as shown in FIG. 11A, the optical fiber comprises a core 2 and a cladding 3 formed outside the core 2. At one part of at least the core 2 is formed a grating 2a (a portion shown by oblique lines in FIG. 11A) having a different refractive index distribution from the refractive index distribution of other portions. That is, a so-called fiber grating is performed (simply referred to as "grating processing" below) for the optical fiber. As shown in FIG. 11B, the optical fiber has a refractive index which is longitudinally changed. The grating 2a functions mainly as an optical filter and the like for reflecting a light alone having a specific wavelength.

FIGS. 12 and 13 show a structure and a manufacturing method of the optical fiber having the grating relating to the present invention.

In the first place, as shown in FIG. 12, an optical fiber 5 is so constructed that a coating layer 4 consisting of an ultraviolet-curing resin and the like is formed outside a bare optical filter 1. In the optical fiber 5, the coating layer 4 is partly removed, so that an exposed portion 1a is formed. A desired portion of the exposed bare optical fiber 1 is grating-processed.

Relating to the grating processing, FIG. 13 shows an example by means of a holographic method. In FIG. 13, the grating-processed portion is shown by the oblique lines.

As shown in FIG. 13, for example, an ultraviolet light UV is split by a beam splitter 8, so that each split ultraviolet light UV is reflected by a mirror 9. Thus, an interference band pattern of the ultraviolet light UV is formed. The exposed bare optical fiber 1 is irradiated on a surface with the ultraviolet light UV.

In such a manner, the exposed bare optical fiber 1 is irradiated with the ultraviolet light UV. At this time, for example, if the bare optical fiber 1 is a Ge dope optical fiber, the refractive index is increased at a core portion of the exposed bare optical fiber 1 in accordance with an irradiation strength of the ultraviolet light UV.

In case of the bare optical fiber 1 shown in FIG. 13, there are the portion having the strong irradiation strength of the ultraviolet light UV and the portion having the weak one. Thus, in the bare optical fiber 1, the refractive index is greatly increased at the portion having the strong irradiation strength of the ultraviolet light UV (shown by a thicker oblique line portion A). The refractive index is little increased at the portion having the weak irradiation strength of the ultraviolet light UV (shown by a thinner oblique line portion B).

As a result, as shown by the oblique line portions A and B in FIG. 13, the bare optical fiber 1 has the portion where the refractive index distribution is longitudinally periodically changed. Such a characteristic is obtained that the light alone having the specific wavelength is reflected at the oblique line portion where the refractive index is changed.

In such a manner, the grating processing is performed. Subsequently, in the optical fiber 5, as shown in FIG. 14, the exposed portion 1a is accommodated in a sleeve 7 which is made of a rigid material such as a rigid plastic and a metal so as not to irradiate the exposed bare optical fiber 1 with the excessive ultraviolet light UV and so as to protect the surface from an external force. Furthermore, the optical fiber 5 and the sleeve 7 are adhered to both ends of the coating layer 4 by an adhesive 6 so that they may be integrated with each other.

In such a manner, the optical fiber 5 having the grating is manufactured.

However, the optical fiber 5 having the structure shown in FIG. 14 is difficult to be bent at the sleeve 7, since the sleeve 7 is rigid. Thus, for example, when a bending load is applied to the optical fiber 5, a stress is concentrated near both of the ends of the sleeve 7. Accordingly, there is arisen such a problem that a light transmission loss is increased and a rupture easily occurs.

For example, there are prepared the ten optical fibers 5 having the sleeve 7 of a 5-mm outer diameter and a 2-cm length. The optical fibers 5 are held for two months in a state that they are coiled around a mandrel having the outer diameter of 30 mm at a tension of 20 g-weight. As a result, nine of the ten optical fibers 5 rupture at the portion near both of the ends of the sleeve 7.

Moreover, the optical fiber 5 has been conventionally examined so that it may be incorporated in a transmitter of, for example, an optical repeater or the like in order to use it therein. Recently, there are user's increasing needs that the optical fiber is arranged in, for example, an optical fiber cable so as to be used.

However, according to the optical fiber 5 having the structure shown in FIG. 14, there is structurally an excessive space between the exposed portion 1a and the sleeve 7 of the bare optical fiber 1. Accordingly, the sleeve 7 has the thicker diameter. Thus, there is arisen the problem that the optical fiber 5 having the grating cannot be arranged in the optical fiber cable whose accommodating space is small.

On the other hand, as described above, when the optical fiber 5 having the grating is manufactured, the coating layer 4 formed on the bare optical fiber 1 is partly removed for irradiating the ultraviolet light. Accordingly, in the exposed bare optical fiber 1 due to a removal of the coating layer 4, the cladding is being exposed to an air having the smaller refractive index than the refractive index of the cladding. Thus, according to the bare optical fiber 1 wherein the grating is formed, at the exposed portion 1a exposed to the air, a cladding-mode light is leaked from the core to the cladding, so that the leaked light is combined to a waveguide mode which passes through the core.

As a result, in a transmission power of a transmitted light which passes through the optical fiber 5, a ripple occurs, due to the cladding mode, at a shorter wavelength side than a Bragg wavelength. The ripple enters, as a noise, into a light signal transmitted in the optical fiber 5, so that a reliability of an optical communication is reduced.

SUMMARY OF THE INVENTION

It is an object of the present invention to provide an optical fiber which can prevent a local stress concentration due to a bending stress and can be arranged in an optical fiber cable having a small accommodating space even if the optical fiber has a grating and its manufacturing method.

It is another object of the present invention to provide an optical fiber which can prevent a ripple generation in a wavelength characteristic caused by a cladding mode and its manufacturing method.

In order to achieve the above objects, according to one aspect of the present invention, there is provided an optical fiber which comprises a coating layer disposed outside a bare optical fiber having a core and a cladding and a grating formed in the core of the exposed bare optical fiber by removing the coating layer, wherein a re-coating layer is disposed in the exposed bare optical fiber.

Preferably, according to another aspect of the present invention, there is provided the optical fiber, wherein the re-coating layer comprises an ultraviolet-curing resin.

Preferably, according to a further aspect of the present invention, there is provided the optical fiber, wherein the ultraviolet-curing resin can be cured by an ultraviolet light except for a wavelength range which can form the grating.

Preferably, according to a still further aspect of the present invention, there is provided the optical fiber, wherein an ultraviolet absorbing agent or an ultraviolet reflecting agent is mixed with the ultraviolet-curing resin.

Preferably, according to a still further aspect of the present invention, there is provided the optical fiber, wherein an outer diameter of the re-coating layer is 0.5 to 1.5 times that of the coating layer.

Preferably, according to a still further aspect of the present invention, there is provided the optical fiber, wherein the re-coating layer has a refractive index which is equal to or larger than the refractive index of the cladding.

In order to achieve the above objects, according to a still further aspect of the present invention, there is provided a method of manufacturing an optical fiber in which the optical fiber comprises a coating layer disposed outside a bare optical fiber having a core and a cladding, the bare optical fiber is exposed by removing the coating layer from the optical fiber, a grating is formed in the core of the exposed bare optical fiber, wherein a re-coating layer is disposed on the exposed bare optical fiber at a temperature of 200° C. or less.

According to the optical fiber of the present invention, the re-coating layer is disposed on the exposed bare optical fiber.

Accordingly, the grating-processed bare optical fiber can be protected from the ultraviolet light and an external force as usual without using a sleeve.

Furthermore, instead of attaching a rigid plastic and a metallic sleeve, the re-coating layer comprising a relatively soft synthetic resin or the like is disposed on the exposed bare optical fiber. Thus, according to the optical fiber of the present invention, even if a bending stress is applied to the re-coating layer, the optical fiber is bent at the re-coating layer. Accordingly, since the local stress applied near the re-coating layer is reduced heretofore in use, the optical fiber can prevent an increase of a light transmission loss in this portion, a rupture of the optical fiber and the like. In addition, the optical fiber is provided with the re-coating layer so as to avoid using the sleeve such as the sleeve for use in the related optical fiber. Accordingly, an inner space is eliminated, which facilitates a miniaturization of the optical fiber.

The optical fiber according to claim 2, wherein the re-coating layer comprises the ultraviolet-curing resin.

This reason is as follows.

That is, when a thermo-setting resin is used as the re-coating layer, a formation of the re-coating layer is accomplished by coating the exposed bare optical filter with the uncured thermo-setting resin, by heating the coated portion and by curing the uncured thermo-setting resin.

Accordingly, if the grating formed on the bare optical fiber is excessively heated, a refractive index distribution of the formed grating is changed. Thus, the grating cannot obtain previously intended desired light reflectivity, light transmittance and the like.

On the contrary, the formation of the re-coating layer comprising the ultraviolet-curing resin can be accomplished by coating the exposed portion of the optical fiber with the uncured ultraviolet-curing resin, by irradiating this coated portion with the ultraviolet light and by curing the uncured ultraviolet-curing resin.

Accordingly, when the ultraviolet-curing resin is used so as to form the optical fiber, it is not necessary to perform a heat treatment for the re-coating layer, compared to a usage of the thermo-setting resin. Thus, the optical fiber, which uses the ultraviolet-curing resin as a material of the re-coating layer, can prevent a change of the refractive index distribution of the grating due to the heat treatment.

As the above-described ultraviolet-curing resin, for example, an urethane acrylate resin and the like can be used.

The optical fiber according to claim 3, wherein the material, which can be cured by the ultraviolet light except for the wavelength range that can form the grating, is used as the ultraviolet-curing resin for forming the re-coating layer.

Accordingly, since the ultraviolet light having the above wavelength is used so as to irradiate the uncured ultraviolet-curing resin during the formation of the re-coating layer, the re-coating layer can be formed. Moreover, it is possible to prevent the refractive index distribution of the grating from changing because of the irradiation of the ultraviolet light.

For example, when the wavelength of the ultraviolet light for use in the grating processing ranges from 190 to 300 nm, the ultraviolet light ranging from 300 to 400 nm is used for curing the resin.

The optical fiber according to claims 4 and 5, wherein the ultraviolet absorbing agent or the ultraviolet reflecting agent is mixed with the ultraviolet-curing resin for forming the re-coating layer.

Accordingly, in a step of forming the re-coating layer, when the uncured ultraviolet-curing resin coated on the exposed bare optical fiber is irradiated with the ultraviolet light, the ultraviolet light enters into the ultraviolet-curing resin. Next, while the ultraviolet light is curing the resin, it progresses toward a surface of the exposed bare optical fiber. However, the ultraviolet light is absorbed or reflected by the ultraviolet absorbing agent or the ultraviolet reflecting agent mixed in the resin.

Consequently, an ultraviolet light level which irradiates the surface of the exposed bare optical fiber is restrained. Accordingly, even if the ultraviolet light is within the wavelength range which can perform the grating processing, it is possible to prevent the refractive index distribution of the grating from changing.

The optical fiber according to claims 6 to 9, wherein the outer diameter of the re-coating layer is 0.5 to 1.5 times that of the coating layer. That is, the outer diameter of the re-coating layer is defined to be the substantially same as that of the coating layer. Therefore, a stage difference between the coating layer and the re-coating layer is reduced. Accordingly, since the optical fiber is difficult to undergo the bending stress at a border portion between the coating layer and the re-coating layer, the local stress concentration can be prevented. Furthermore, since the outer diameter of the coating layer is reduced, the optical fiber is preferable for a size-reduction of the diameter.

The optical fiber according to claim 10, wherein the re-coating layer has the refractive index which is equal to or larger than the refractive index of the cladding.

Accordingly, the optical fiber can restrain the ripple generation in the wavelength characteristic caused due to the cladding mode.

The method of manufacturing the optical fiber according to claim 11, wherein the re-coating layer is disposed on the exposed bare optical fiber at the temperature of 200° C. or less.

It is known that the refractive index distribution of the grating formed in the optical fiber is changed by the heat at the temperature more than 200° C. without the irradiation of the ultraviolet. As described above, the temperature is controlled during the formation of the re-coating layer, so that the temperature of the grating formed in the bare optical fiber can be also controlled. Accordingly, the change in the refractive index distribution can be prevented.

According to the optical fiber of claim 1, since the re-coating layer is disposed on the exposed bare optical fiber, the increase of the light transmission loss, the rupture of the optical fiber and the like can be prevented. Moreover, since the increase of the diameter is restrained at the portion where the re-coating layer is disposed, the optical fiber can be arranged in the optical fiber cable having the small accommodating space. The above effects can be obtained.

According to the optical fiber of claim 2, since the re-coating layer comprises the ultraviolet-curing resin, such an effect can be obtained that it is possible to restrain the change in the refractive index distribution of the grating due to the heat during the formation of the re-coating layer.

According to the optical fiber of claim 3, since the ultraviolet-curing resin can be cured by the ultraviolet light except for the wavelength range which can form the grating, such an effect can be obtained that it is possible to restrain the change in the refractive index distribution of the grating, compared to the optical fiber which uses the thermo-setting resin.

According to the optical fiber of claims 4 and 5, since the ultraviolet absorbing agent or the ultraviolet reflecting agent is mixed with the ultraviolet-curing resin, such an effect is can be obtained that it is possible to restrain the ultraviolet light level to be irradiated on the surface of the exposed bare optical fiber.

According to the optical fiber of claims 6 to 9, since the outer diameter of the re-coating layer is defined to be 0.5 to 1.5 times that of the coating layer, the effect can be much more effectively obtained than the optical fiber according to claim 1.

According to the optical fiber of claim 10, since the re-coating layer has the refractive index which is equal to or larger than the refractive index of the cladding, such an effect can be obtained that it is possible to restrain the ripple generation in the wavelength characteristic caused by the cladding mode.

According to the method of manufacturing the optical fiber of claim 11, since the re-coating layer is disposed on the exposed bare optical fiber at the temperature of 200° C. or less, such an effect can be obtained that it is possible to more effectively restrain the change in the refractive index distribution of the grating due to the heat.

The above objects and other objects, features and advantages of the present invention are readily appreciated from the following detailed description when taken in connection with the accompanying drawings.

BRIEF DESCRIPTION OF THE DRAWINGS

FIG. 5 is a graph showing the loss characteristic of the grating in the optical fiber shown in FIG. 3 in which the re-coating layer is disposed;

FIG. 6 is a front view for illustrating a first deformation example of the optical fiber according to the second embodiment of the present invention, a principal portion of the optical fiber partly in section;

DETAILED DESCRIPTION OF THE PREFERRED EMBODIMENTS

Hereinafter, embodiments of the present invention will be described in detail in accordance with FIGS. 1 to 10.

Figure 1:
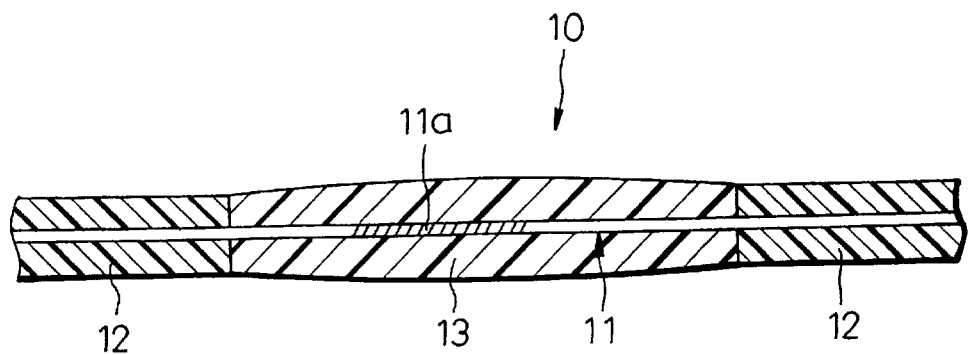
FIG. 1 is a cross sectional view showing a structure of an optical fiber according to a first embodiment of the present invention.

Referring now to FIG. 1, there is shown an optical fiber 10, an example of a first embodiment of the present invention.

The optical fiber 10 is provided with a coating layer 12 consisting of, for example, an ultraviolet-curing resin or the like outside of a bare optical fiber 11. The coating layer 12 is removed, thereby resulting in the exposed bare optical fiber 11. The exposed bare optical fiber 11 is provided with a re-coating layer 13 comprising the ultraviolet-curing resin or the like to which a pigment is added, for example. On the exposed bare optical fiber 11 is formed a grating 11a (a portion shown by oblique lines in FIG. 1) by means of a method described in Description of the Related Art.

A material of the re-coating layer 13 is selected so as to enable it to prevent a change in a refractive index distribution of the grating 11a formed on the bare optical fiber 11 during a formation of the re-coating layer 13.

For example, when the re-coating layer 13 is composed of the ultraviolet-curing resin, such a material may be selected and used as to be curable with an ultraviolet except for a grating processing wavelength, that is, a wavelength range from 190 to 300 nm, or the ultraviolet-curing resin may be previously mixed with, for example, an ultraviolet absorbing agent such as phenyl salicylate and an ultraviolet reflecting agent such as titanium white so as to be used.

Next, a method of manufacturing the optical fiber 10 having the grating 11a is described hereinafter.

Figure 12:
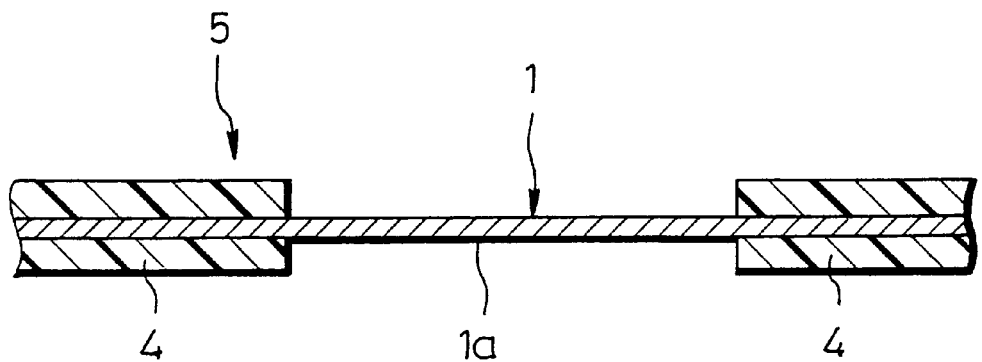
FIG. 12 is a cross sectional view showing one process of a method of manufacturing the optical fiber relating to the present invention having the grating.
Figure 13:
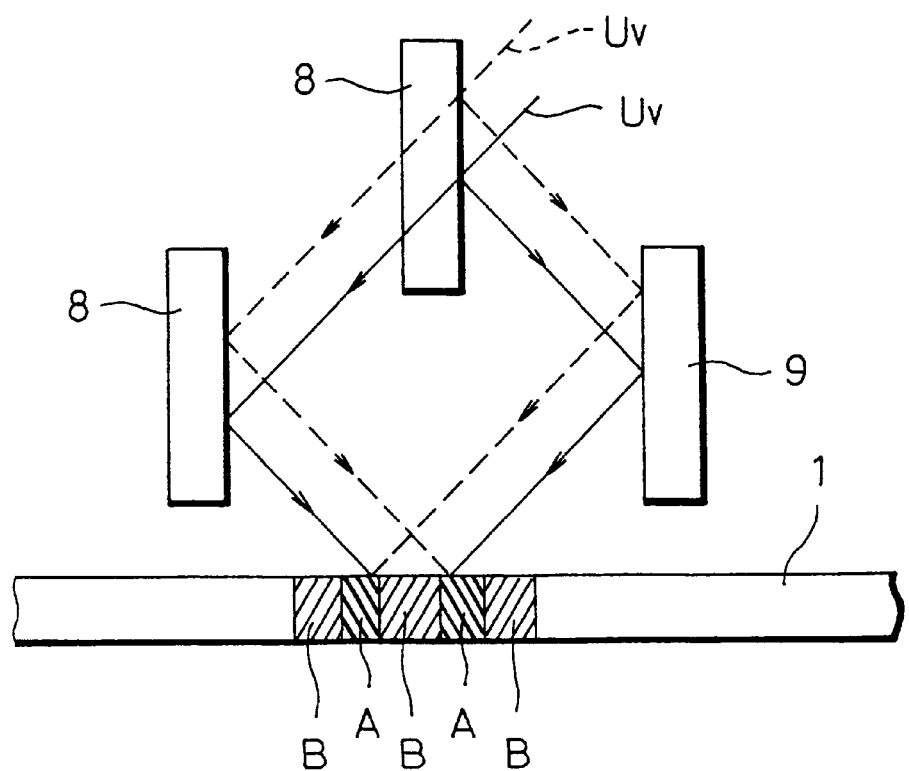
FIG. 13 is model diagram showing a known method of forming the grating in the optical fiber as a model.

In the first place, in accordance with the related art described with reference to FIGS. 12 and 13, a grating processing was performed for the bare optical fiber 11.

Figure 2A:
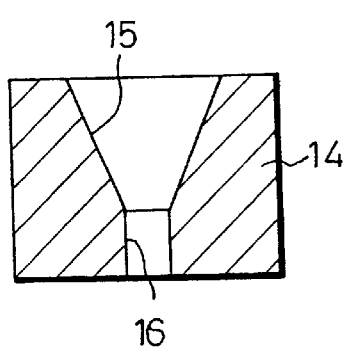
FIGS. 2A to 2D are cross sectional views showing each process for disposing a re-coating layer in the optical fiber shown in FIG. 1.

Next, as shown in FIG. 2A, a die 14 was prepared. As illustrated, the die 14 has a resin reservoir 15 and an optical fiber inserting portion 16, communicated with the resin reservoir 15, having an inner diameter substantially same as a desired outer diameter of the re-coating layer 13. A series of through holes are formed by the resin reservoir 15 and the inserting portion 16.

Figure 2B:
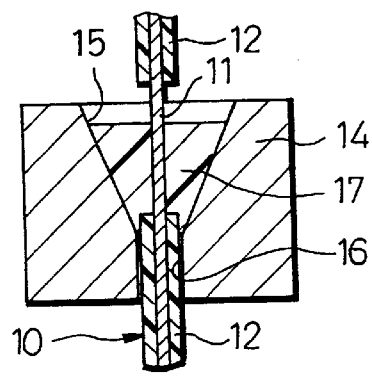

As shown in FIG. 2B, the optical fiber 10 was inserted into the resin reservoir 15 and the inserting portion 16 of the die 14.

The optical fiber 10 was positioned so that a lower end of the exposed bare optical fiber 11, caused by a removal of the coating layer 12, may be located over the inserting portion 16. In the resin reservoir 15 was filled with an uncured ultraviolet-curing resin.

Figure 2C:
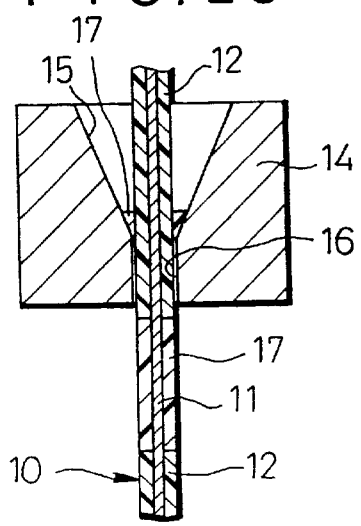

Subsequently, as shown in FIG. 2C, the optical fiber 10 was relatively moved to a lower side of the die 14. Thus, an outside of the exposed bare optical fiber 11 was coated with an uncured resin 17 having the substantially same outer diameter as the inner diameter of the inserting portion 16.

Figure 2D:
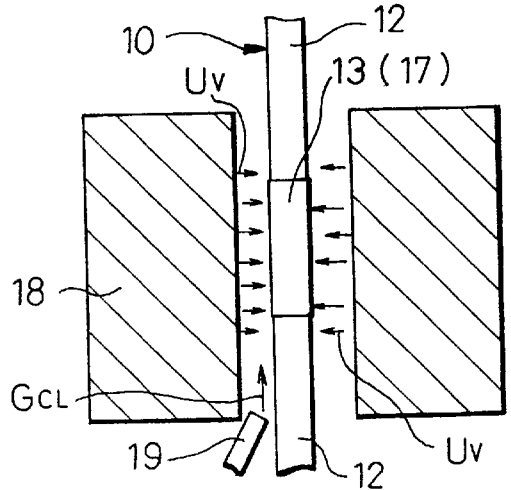

After then, the optical fiber 10 was removed from the die 14. As shown in FIG. 2D, the optical fiber 10 was set to an ultraviolet-light irradiator having an ultraviolet-light irradiation source 18 and a gas supply port 19. For example, the optical fiber 10 was irradiated with an ultraviolet light UV having the wave length of 360 nm from the ultraviolet-light irradiation source 18, so that the uncured resin 17 was cured so as to form the re-coating layer 13.

Note that cooling gas GCL such as low-temperature nitrogen gas was flowed into the ultraviolet-light irradiator from the supply port 19 during an irradiation of the ultraviolet light UV for cooling the re-coating layer 13 so as not to exceed 200° C.

There were prepared the ten optical fibers 10, whose re-coating layer 13 had the outer diameter of 260 μm, manufactured in accordance with the above description. The optical fibers 10 were held for two months in a state that they were coiled around a mandrel having the outer diameter of 30 mm at a tension of 20 g-weight. As a result, in all of the ten optical fibers 10, a rupture, a break and the like due to a local bending stress of the re-coating layer 13 did not occur.

In the first embodiment, the ultraviolet-curing resin is used as the resin for forming the re-coating layer 13. However, according to the present invention, since the material of the re-coating layer 13 is not limited to the ultraviolet-curing resin, for example, a thermo-setting resin, a two-part mixed curing resin and the like may be used.

It should be noted that, preferably, both of the coating layer 12 and the re-coating layer 13 comprise an identical synthetic resin based material.

In addition, in the first embodiment, as shown in FIG. 1, although the optical fiber 10 has the re-coating layer 13 whose outer diameter is the substantially same as the outer diameter of the coating layer 12, the outer diameter is not limited to the substantially same one.

However, in order to prevent a local stress concentration on the optical fiber 10 due to the bending stress, or in order to arrange the re-coating layer 13 into an optical fiber cable having less arrangement space, preferably, the outer diameter of the re-coating layer 13 is 0.5 to 1.5 times that of coating layer 12.

Figure 14:
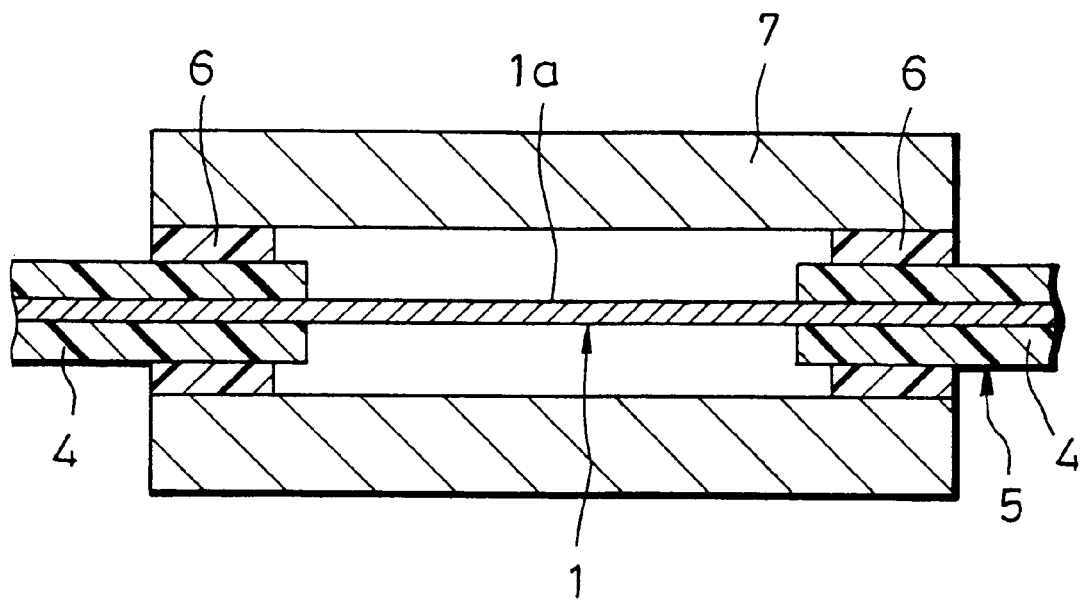
FIG. 14 is a cross sectional view showing a known structure of the optical fiber relating to the present invention having the grating and one process of its manufacturing method.

Furthermore, according to the optical fiber 10 of the first embodiment, although the outside of the exposed bare optical fiber 11 is coated with a single re-coating layer 13 alone, another layer having a different function may be formed outside the re-coating layer 13. Moreover, for example, when less bending stress is applied to the optical fiber 10, if necessary, similarly to a case shown in FIG. 14, a sleeve 7 may be attached to an outer periphery of a portion where the re-coating layer 13 is formed, so that this portion is protected.

According to the first embodiment, as shown In FIGS. 2A to 2D, the re-coating layer 13 is formed by the use of the die 14 and the ultraviolet-light irradiator, independently of the die 14. However, the present invention is not limited to the first embodiment so as to form the re-coating layer 13. Accordingly, any method and apparatus may be used so that the re-coating layer 13 can be formed outside the exposed bare optical fiber 11.

Furthermore, according to the first embodiment, the grating processing is described with reference to FIG. 13. However, of course, a grating processing method and a refractive index distribution pattern are not limited to those shown in FIG. 13. Accordingly, any grating processing method and refractive index distribution pattern are also included.

Moreover, according to the first embodiment, as shown in FIG. 2D, the cooling gas GCL is used for cooling so that a temperature of the re-coating layer 13 is controlled so as to be 200° C. or less. However, a temperature controlling method is not limited to the method by the use of the cooling gas GCL alone.

Experimental Result Relating to the Material and Formation of the Re-coating Layer Firstly, in the optical fiber according to the present invention, so as not to change the refractive index distribution of the grating, it is examined whether it is preferable which material the re-coating layer 13 is formed by and how the re-coating layer 13 is formed. The result is simply described below.

Herein, relating to ①the material of a sample to be the re-coating layer 13 and ②a resin temperature during the formation of the re-coating layer 13, they are changed for each sample, respectively. Similarly to the first embodiment, the optical fiber 10 having the grating 11a is manufactured. Relating to the obtained optical fiber 10, ③each characteristic value (where it denotes the refractive index of the grating) is compared to each other. In this case, as testing conditions, ①the material, ②the resin temperature and the resultant ③the refractive Index are schematically shown in Table 1.

TABLE 1

| Sample | ①Material | ②Resin temperature (° C.) | ③Refractive index (%) |
|---|---|---|---|
| 1 | Ultraviolet-curing resin | 50 | 99 |
| 2 | (Curing wavelength ≠ grating | 100 | 99 |
| 3 | processing wavelength) | 150 | 99 |
| 4 | No pigment | 200 | 99 |
| 5 |  | 250 | 90 |
| 6 | Ultraviolet-curing resin | 50 | 99 |

TABLE 1-continued

| Sample | ① Material | ② Resin temperature (° C.) | ③ Refractive index (%) |
|---|---|---|---|
| 7 | (Curing wavelength = grating | 100 | 99 |
| 8 | processing wavelength) | 150 | 99 |
| 9 | Added pigment | 200 | 99 |
| 10 |  | 250 | 88 |
| 11 | Ultraviolet-curing resin | 50 | 99 |
| 12 | (Curing wavelength = grating | 100 | 94 |
| 13 | processing wavelength) | 150 | 83 |
| 14 | No pigment | 200 | 68 |
| 15 | Thermo-setting resin | 150 | 90 |
| 16 |  | 350 | 10 |

In the optical fiber 10 according to the first embodiment, the thermo-setting resin is not used as the re-coating layer 13. In the same way as the ultraviolet-curing resin, after the exposed bare optical fiber 11 is coated with the uncured resin 17, the uncured resin 17 is not irradiated with the ultraviolet light, but is alternatively heated. A test result of heating is also appended for a comparison (see samples 15 and 16).

As treatment conditions of each sample, in case of samples 1 to 14, an atmospheric temperature is adjusted by means of the cooling gas GCL (nitrogen gas). It is assumed that ② the resin temperature is defined as the atmospheric temperature. The ultraviolet light (wavelength of 360 nm) has an irradiance of 0.3 mW/cm². An irradiating time is set to three minutes.

Furthermore, in case of the sample 15 and 16, ② the resin temperature is defined as a preset heating temperature. The samples 15 and 16 are heated for two minutes under a nitrogen gas atmosphere.

In the first place, as clearly shown in Table 1, in either sample, a considerable reduction of the grating refractive index is found at the resin temperature of 250° C. or more, compared to the resin temperature less than 250° C.

Furthermore, in the samples 1 to 5, the curing wavelength is different from the grating processing wave length. Accordingly, without using the pigment, the grating refractive index as high as 99% and 90% are obtained at the resin temperature of 200° C. or less and 250° C., respectively.

On the contrary, in the samples 6 to 10, although the curing wavelength is the same as the grating processing wave length, the pigment is added to the samples so that the exposed bare optical fiber 11 may be not irradiated with the ultraviolet light UV. Thus, in the optical fiber 10 wherein the re-coating layer 13 is formed by the ultraviolet-curing resin of the samples 5 to 10, the samples 6 to 10 also obtains the refractive index of the grating 11a as high as the samples 1 to 5.

In the optical fiber obtained by the use of the sample 9, since the resin temperature is 200° C., the refractive index is expected to be 99%. However, probably due to a synergistic effect of the ultraviolet light and the temperature, the refractive index of the grating is slightly reduced.

Furthermore, in the optical fiber obtained by the use of the samples 11 to 14, the curing wavelength is the same as the grating processing wavelength, and the pigment is not added to the samples. Thus, more specifically, in the optical fiber obtained by the use of the sample 14 having the resin temperature of 200° C., the refractive index of the grating is considerably reduced. However, in the optical fiber obtained by the use of the sample 14, its grating refractive index is higher than that of the optical fiber obtained by the use of the sample 16 comprising the thermo-setting resin whose resin temperature is 350° C.

In case of the thermo-setting resin, in the optical fiber manufactured by the use of the sample 15 having the resin temperature of 150° C., resulting in the grating refractive index as high as 90%. On the other hand, in the optical fiber obtained by the use of the sample 16 having the resin temperature of 350° C., the heating temperature greatly exceeds 200° C. Accordingly, the grating refractive index results in a very low value as low as 10%.

As described above, for the material of the re-coating layer 13 of the optical fiber according to the present invention, the ultraviolet-curing resin is preferable. More preferably, the ultraviolet-curing resin may have the curing wavelength out of the grating processing wavelength range, or it may be mixed with the ultraviolet absorbing agent or the ultraviolet reflecting agent. Furthermore, preferably, the resin temperature is 200° C. or less during the formation of the re-coating layer 13.

In the optical fiber 10 according to the first embodiment, such an example is described that the pigment and the ultraviolet reflecting agent or the ultraviolet absorbing agent are added to the re-coating layer 13, respectively. However, according to the present invention, the ultraviolet reflecting agent or the ultraviolet absorbing agent may be the pigment itself, such as the titanium white, combining the ultraviolet reflecting agent or the ultraviolet absorbing agent.

Next, with reference to FIGS. 3 to 10 is hereinafter described the optical fiber according to a second embodiment for achieving a second object of the present invention.

Figure 3:
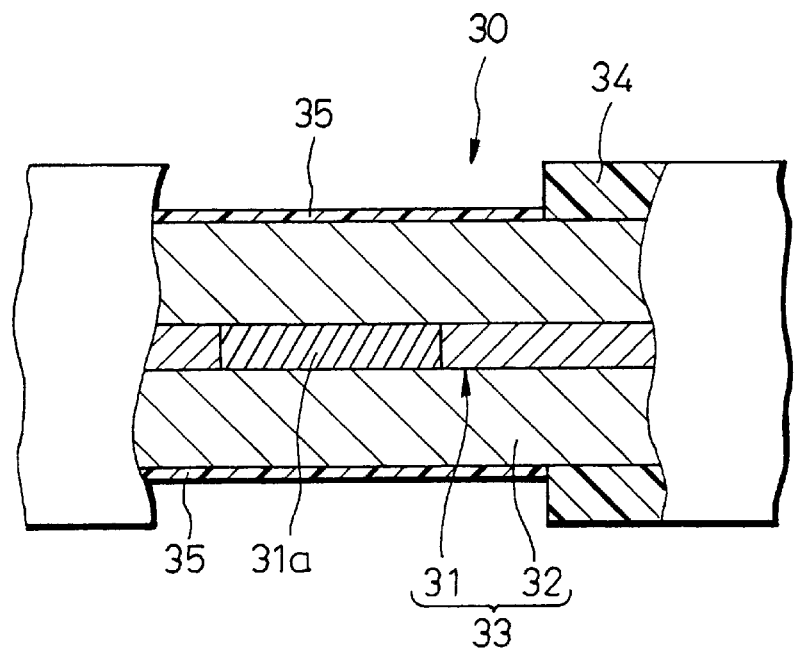
FIG. 3 is a partly broken away cross sectional view showing an example of the optical fiber according to a second embodiment of the present invention.

As shown in FIG. 3, an optical fiber 30 is provided with a coating layer 34 outside of a bare optical fiber 33 having a core 31 and a cladding 32. The optical fiber 30 is so constructed that a grating 31a is formed, through the cladding 32, in the core 31 of the exposed bare optical fiber 33 due to the removal of the coating layer 34. A re-coating layer 35 is formed on the exposed bare optical fiber 33.

The re-coating layer 35 is composed of the material having the refractive index which is equal to or larger than the refractive index of the cladding 32. Preferably, the re-coating layer 35 may be, for example, the thermo-setting resin such as a silicone resin, e.g., an organopolysiloxane having a phenyl radical, and the ultraviolet-curing resin such as an urethane acryalte resin, e.g., a polyether urethane acrylate, DESOLITE 950 Y 100 marketed by DSM Corporation.

When the re-coating layer 35 is formed, the resin is coated on the outer periphery of the exposed bare optical fiber 33 over a longer area than the grating 31a. Next, the resin can only be heat-cured (in case of using the thermo-setting resin) or be ultraviolet-cured (in case of using the ultraviolet-curing resin).

Since the optical fiber 30 is provided with the re-coating layer 35, a border between the cladding 32 and an air does not exist. Accordingly, even if a light source wavelength is shorter than a Bragg wavelength, a cladding-mode light does not pass through the cladding 32. That is, the cladding 32 does not function as a waveguide path. Accordingly, in a transmission of the grating, a ripple does not occur.

EXAMPLES

There was prepared a single mode communicating optical fiber having a fiber diameter of 125 μm, a core diameter of 10 μm and a refractive index difference (Δ) of 0.3%. The refractive index of the core was 1.462, and the refractive index of the cladding was 1.457.

The approximately 8-mm-long coating layer was peeled from the optical fiber, so that the bare optical fiber was exposed. The exposed bare optical fiber was irradiated with the ultraviolet light having the wavelength of 248 nm. A uniform grating, having a central wavelength (=Bragg wavelength) of about 1518 nm, was formed on the bare optical fiber over approximately 3 mm in length.

While the cladding of the optical fiber was being exposed to the air (having the refractive index 1) on an outer periphery surface, a loss characteristic of the formed grating was measured. The result was shown in FIG. 4. A loss measurement was accomplished by measuring a wavelength distribution of a transmission power (nW) of a light signal to be transmitted in the optical fiber.

Next, after the ultraviolet-curing resin was applied to the exposed bare optical fiber, the ultraviolet light having the wavelength of 360 nm was irradiated, so that the re-coating layer was formed. The re-coating layer had the refractive index of 1.51.

In this state, the loss characteristic of the grating was measured, and the result was shown in FIG. 5.

Figure 4:
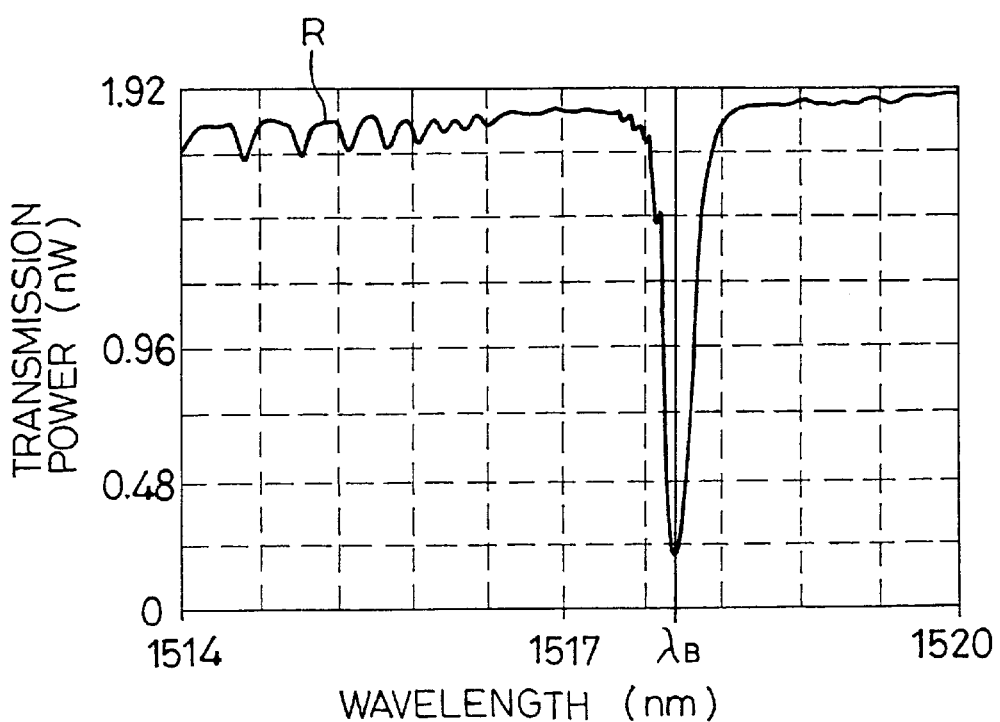
FIG. 4 is a graph showing a loss characteristic of a grating prior to disposing the re-coating layer, relating to the optical fiber shown in FIG. 3.

As clearly shown in FIG. 4, when the cladding was exposed to the air on the outer periphery thereof, a periodical ripple R occurred at a shorter wavelength side than a Bragg wavelength $\lambda B$.

However, when the exposed bare optical fiber was provided with the re-coating layer whose refractive index was 1.51, as clearly shown in FIG. 5, the ripple R disappeared which was shown at the shorter wavelength side than the Bragg wavelength $\lambda B$ in FIG. 4.

As clearly described above, the coating layer was removed, so that the bare optical fiber was exposed. The exposed bare optical fiber was provided with the re-coating layer having the refractive index which was equal to or larger than the refractive index of the cladding. In this case, it was possible to prevent the ripple, in a wavelength characteristic caused by the cladding mode, from generating.

Accordingly, the optical fiber of the second embodiment is constructed as described below so that it can be used as the optical fiber with an optical connector.

Hereinafter, a deformation according to the second embodiment will be described with reference to FIGS. 6 to 10.

According to the embodiment described below, the optical fiber comprises the core and the cladding, wherein the coating layer is formed outside the cladding. For simplicity, they are omitted in the drawings.

As shown in FIG. 6, an optical fiber 40 is fused to an optical fiber 41 near a grating 40a. A single-fiber connector 42 is mounted to one end of the optical fiber 41. Furthermore, an extending portion of the optical fiber 41 is protected by a so-called SC connector, a reinforcement cord 42a extending from the single-fiber connector 42.

Figure 7:
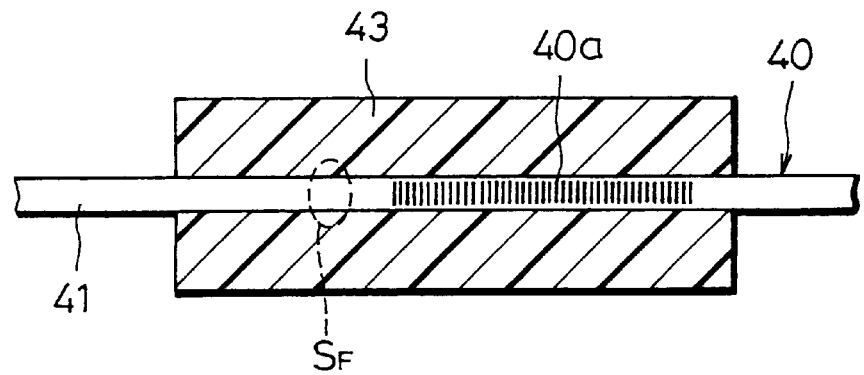
FIG. 7 is an enlarged cross sectional view of a cover disposed at a grating portion of the optical fiber shown in FIG. 6.

As shown in FIG. 7, the optical fiber 40 is provided with a cover 43 as the re-coating layer at the outer periphery of a fused splicing portion SF fused to the optical fiber 41 and the grating 40a. The cover 43 comprises a hot-melt type adhesive and the like. The cover 43 is the cladding for use in a reinforcement of the fused splicing portion SF. The refractive index of the cover 43 is equal to or larger than that of the claddings of the optical fibers 40 and 41.

In the cover 43, one part of a pipe, which is made of the synthetic resin such as a nylon, is axially divided into halves. In the divided portion is accommodated the grating 40a and the fused splicing portion SF where the optical fiber 40 is fused to the optical fiber 41, in which the soft synthetic resin such as a silicone rubber or a butyl rubber may be filled.

Accordingly, the optical fiber 40 is so constructed that the grating 40a is provided with the cover 43 of which the refractive index is equal to or larger than that of the cladding. Therefore, since the cladding-mode light is leaked outward, it is possible to prevent the ripple from generating. Thus, the optical fiber 40 can prevent a noise generation caused by the ripple in the transmitted light signal. In addition, since the cover 43 is the material for use in the reinforcement of the fused splicing portion SF as described above, it can be provided at a low cost and with less man-hour. Furthermore, since the cover 43 can protect the grating 40a and can reinforce the fused splicing portion SF, It is possible to improve a reliability of the optical fiber 40.

Hereinafter, other deformations according to the second embodiment will be subsequently described. The same elements have the same reference numbers, so that a repeated description is omitted.

Figure 8:
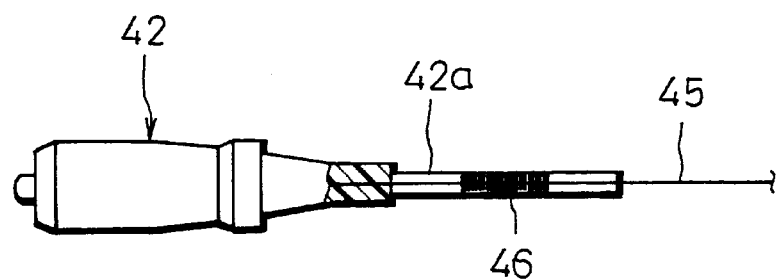
FIG. 8 is a front view, the principal portion of a second deformation example partly in section.

In the first place, referring to FIG. 8, there is shown an optical fiber 45 having one end mounted to the single-fiber connector 42. The optical fiber 45 is provided, at the outer periphery of the grating (not shown), with a re-coating layer 46 having the refractive index which is equal to or larger than the refractive index of the cladding comprising the ultraviolet-curing resin. This portion is accommodated in the reinforcement cord 42a.

The optical fiber 45 is so constructed that the re-coating layer 46 is disposed at the outer periphery of the grating. Accordingly, the cladding-mode light is leaked outward, so that it is possible to prevent the noise generation resulted from the ripple in the transmitted light signal.

Furthermore, the optical fiber 40 is so constructed that the cover 43 is extruded outward. On the other hand, the optical fiber 45 is so constructed that the re-coating layer 46 alone is formed at the outer periphery of the grating. Accordingly, the re-coating layer 46 can be formed at the low cost, and it can also have excellent handling property. Moreover, the optical fiber 45 is so constructed that the portion forming the re-coating layer 46 is accommodated in the reinforcement cord 42a. Accordingly, the optical fiber 45 can avoid the stress concentration on the portion where the re-coating layer 46 is formed. Therefore, since it is possible to obtain a stable characteristic over a long period, the optical fiber 45 has the high reliability. Note that the optical fiber 45 needs a screening and the like so as to ensure a strength of the portion where the re-coating layer 46 is formed.

Figure 9:
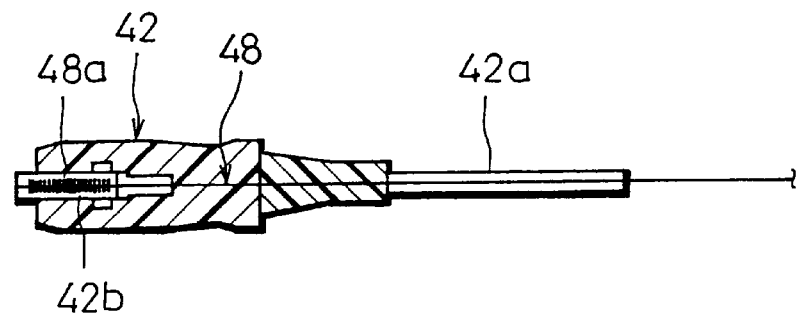
FIG. 9 is a front view, the principal portion of a third deformation example partly in section.
Figure 10:
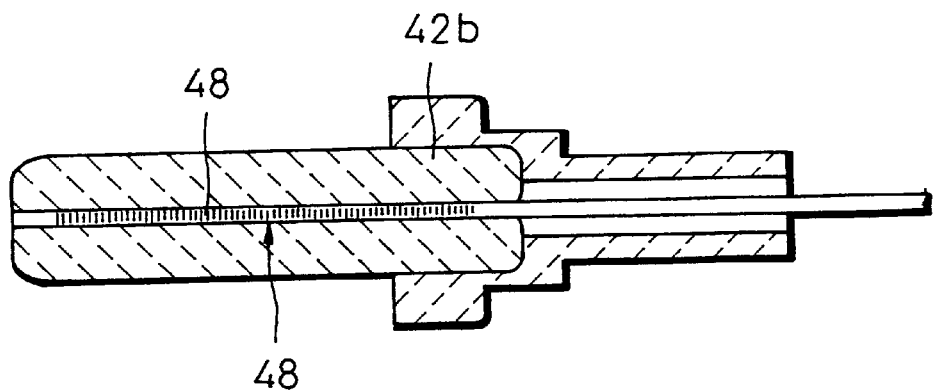
FIG. 10 is an enlarged cross sectional view showing a ferrule of an optical connector shown in FIG. 9.
Figure 11A:
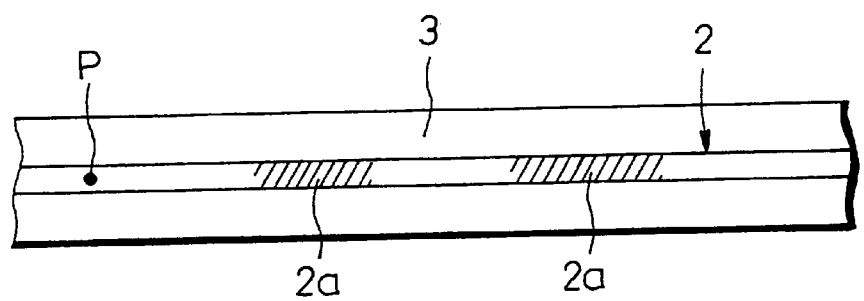
FIG. 11A is a cross sectional view of the optical fiber relating to the present invention having the grating.
Figure 11B:
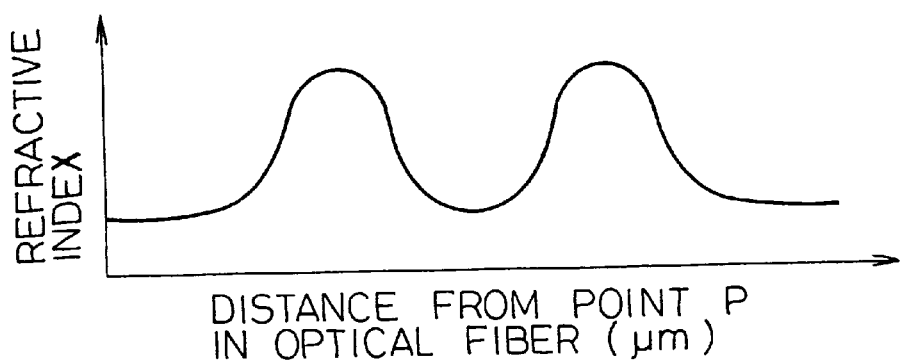
FIG. 11B is a graph showing a refractive index in a core.

On the other hand, as shown in FIG. 10, an optical fiber 48 in FIG. 9 is so constructed that a grating 48a is accommodated in a ferrule 42b of the single-fiber connector 42. The optical fiber 48 is adhered to the ferrule 42b by an adhesive.

Accordingly, the optical fiber 48 is provided, at the outer periphery of the grating 48a, with an adhesive layer as the re-coating layer of which the refractive index is equal to or larger than that of the cladding. Thus, since the cladding-mode light is leaked, the optical fiber 48 can prevent the noise generation due to the ripple in the transmitted light signal. Furthermore, since the optical fiber 48 is so constructed that the grating 48a is accommodated in the ferrule 42b, the grating 48a can be reinforced without using a particular material.

Sometimes, the optical fiber 48 may be a particular fiber for obtaining a desired characteristic during the formation of the grating 48a. In order to improve a connectability to an optical path, the optical fiber 48 may be cut off near the grating 48a so that another optical fiber is fused to this cut portion. In this case, in the optical fiber 48, the fused splicing portion becomes thicker, so that the thicker portion itself cannot be sometimes accommodated in the ferrule 42b.

Accordingly, when the normal optical fiber is fused to the optical fiber 48, preferably, the optical fiber 48 is slightly longitudinally tensioned so that the fused splicing portion may not be thicker so as to thin the diameter.

As described above, in the optical fiber according to the second embodiment described with reference to FIGS. 3 to 10, the outer periphery of the grating is provided with the re-coating layer of which the refractive index is equal to or larger than that of the cladding. Accordingly, it is possible to prevent the noise generation in the light signal due to a combination of the cladding-mode light leaked from the core to the cladding and a waveguide mode passing through the core. Furthermore, the optical fiber has also a secondary effect that the grating is reinforced by the coating layer such as the cover disposed at the outer periphery of the grating.

What is claimed is:

1. In an optical fiber comprising a bare optical fiber, including a core and cladding and having an outer coating, and wherein a portion of the outer coating has been removed and a grating formed in the exposed bare optical fiber by ultraviolet irradiation, the improvement wherein substantially only the portion of the bare optical fiber from which the coating layer has been removed, is coated with a re-coating layer.

2. The optical fiber according to claim 1, wherein said re-coating layer comprises an ultraviolet-curing resin.

3. The optical fiber according to claim 2, wherein said ultraviolet-curing resin can be cured by an ultraviolet light except for a wavelength range which can form the grating.

4. The optical fiber according to claim 3, wherein the ultraviolet absorbing agent or the ultraviolet reflecting agent is mixed with said ultraviolet-curing resin.

5. The optical fiber according to claim 3, wherein the outer diameter of said re-coating layer is 0.5 to 1.5 times that of said coating layer.

6. The optical fiber according to claim 2, wherein an ultraviolet absorbing agent or an ultraviolet reflecting agent is mixed with said ultraviolet-curing resin.

7. The optical fiber according to claim 6, wherein the outer diameter of said re-coating layer is 0.5 to 1.5 times that of said coating layer.

8. The optical fiber according to claim 2, wherein the outer diameter of said re-coating layer is 0.5 to 1.5 times that of said coating layer.

9. The optical fiber according to claim 1, wherein an outer diameter of said re-coating layer is 0.5 to 1.5 times that of said coating layer.

10. The optical fiber according to claim 1, wherein said re-coating layer has a refractive index which is equal to or larger than the refractive index of said cladding.

11. A method of manufacturing an optical fiber in which said optical fiber comprising a coating layer disposed outside a bare optical fiber having a core and a cladding, said bare optical fiber exposed by removing said coating layer from said optical fiber, a grating formed in said core of said exposed bare optical fiber, wherein a re-coating layer is disposed on substantially only said exposed bare optical fiber at a temperature of 2° C. or less.

* * * * *